Feb. 21, 1967  H. E. FROHNECKE  3,304,608
METHOD AND DEVICE FOR TAKING IMPRESSIONS OF TEETH
Filed March 24, 1964
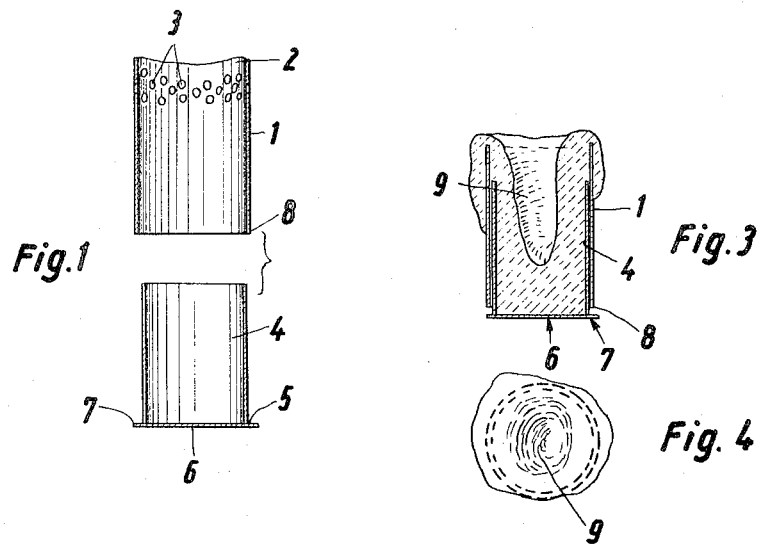
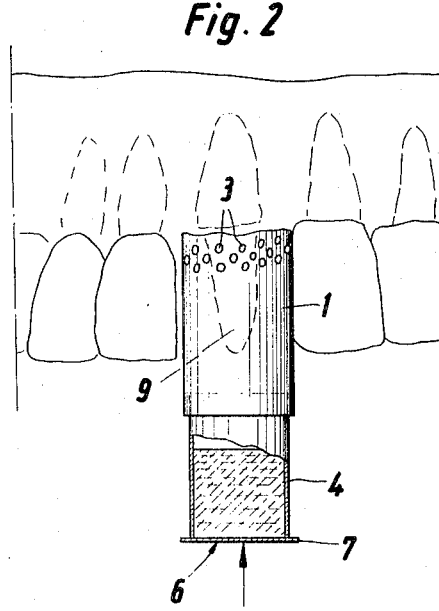
Inventor:
Hans E. Frohnecke
By
Western & Western United States Patent Office 3,304,608
Patented Feb. 21, 1967

3,304,608
METHOD AND DEVICE FOR TAKING
IMPRESSIONS OF TEETH
Hans Ernst Frohnecke, Berlin, Germany, assignor to
Frohnecke K.G., Berlin, Germany
Filed Mar. 24, 1964, Ser. No. 354,330
Claims priority, application Germany, Mar. 27, 1963,
F 39,341
2 Claims. (Cl. 32—17)

For taking impressions of teeth in the manufacture of dentures, especially crown caps, an impression ring is used which is pushed over the tooth to be provided with a crown cap or the like, and then the ring is filled with molding compound. The filling of the molding compound into the form ring is effected by hand using a spatula and applying a certain pressure to attain an accurate mold of the tooth to be provided with a crown cap.

The invention provides a method by which the molding operation is substantially simplified and which ensures obtaining uniform molds in all instances.

The method of the invention consists in that the molding ring, which is pushed over the tooth to be provided with a crown cap or to be replaced by a denture, is filled at least partly with molding compound. Subsequently a thin-walled hollow cylinder, fitting inside the molding ring and closed on its lower end, also filled with molding compound, is inserted into the molding ring, the surplus molding compound escaping through openings in the upper part of the molding ring, as will be explained in greater detail hereinbelow.

According to the invention, a device for carrying out the aforedescribed method consists of a known molding ring provided with lateral openings at its end directed towards the jaw, and of a thin-walled hollow cylinder fitting in the molding ring and closed on one of its sides, which cylinder is preferably made of the same material as the molding ring, said hollow cylinder being provided at its closed end with a narrow flange preferably formed by the edge of the circular disc closing said cylinder.

The invention now will be further explained with reference to the accompanying drawings. However, it should be understood that these are given merely by way of illustration, and not of limitation, and that numerous changes may be made in the details without departing from the spirit and the scope of the invention as hereinafter claimed. Illustrated is an embodiment of the device to carry out the method of taking impressions of teeth according to the invention.

In the drawing:
FIG. 1 is an axial section through the device;
FIG. 2 is a side elevational view, partly in section, of the device in situ;
FIG. 3 is a section through the device after having been withdrawn from the tooth at the end of the molding operation, and
FIG. 4 is a top plan view on the device of FIG. 3.

Referring now to the drawing:
As shown in FIG. 1, one part of the device for carrying out the method according to the invention consists of the molding ring 1 made in a known manner, as for example of copper sheeting. Ring 1 at its jaw end 2, is provided with a plurality of lateral openings 3 allowing the surplus molding compound to escape. The ring 1 cooperates with a hollow cylinder 4 closed at one end 5 by a circular cover plate 6 and preferably made of the same material as the molding ring 1. The cover plate 6, which is also of this material, is provided with a rim 7 projecting beyond the hollow cylinder 4 in a flange-like manner. When the hollow cylinder 4 is inserted in the molding ring 1, the rim 7 abuts against the edge 8 of the molding ring 1, which is situated at the end opposite the jaw end thereof. Thereby and in cooperation with the openings 3 for the escape of the surplus molding compound, the pressure is determined which prevails around the tooth 9 at the end of the molding operation.

By pressing the hollow cylinder 4, which is filled with molding compound, into the molding ring 1, which is also at least partly filled with molding compound, the tooth (FIG. 2) is tightly surrounded on all sides by the molding compound, the surplus molding compound displaced by the insertion of the hollow cylinder 4 in the molding ring 1 escaping through the lateral openings 3 at the jaw end 2 of the molding ring 1.

Experience has shown that by adopting the molding method according to the invention an appreciably more accurate impression of the tooth 9 is ensured than hitherto attained so that errors in the manufacture of the crown cap or the denture, respectively, are reliably avoided. This is due to the fact that the molding method according to the invention is always effected, in consideration of the escape of the surplus molding compound through the lateral openings 3 at the jaw end 2 of the molding ring 1, in the same manner and under the appreciable constant pressure of the molding compound. This pressure is generated by the insertion of the hollow cylinder 4 in the molding ring 1.

I claim as my invention:
1. A process for taking impressions of teeth, which comprises pushing a ring, filled at least partly with a molding compound and provided with perforations at the end closest to the gums, over the tooth whose impression is to be taken, and inserting a tightly fitting cylinder, filled with molding compound, in said ring, causing the excess molding compound to escape through said perforations and exerting constant pressure on said tooth; allowing the molding compound around the tooth to set, and withdrawing the assembly from the tooth.

2. A device for taking impressions of teeth, which comprises, in combination, a ring having a plurality of perforations at one end; a thin-walled hollow cylinder, inserted in said ring, of a diameter tightly fitting said ring and of shorter length than the same; a cover plate closing one end of said cylinder and of larger diameter than the latter, thus forming a flange stopping entry of said cylinder in said ring at a predetermined length; both said ring and said cylinder being capable of holding a molding compound; said cylinder being inserted in said ring at the end opposite that having the perforations; said cylinder in said ring being adapted to force out excess molding compound and to exert constant pressure on the tooth around which it sits.

References Cited by the Examiner
UNITED STATES PATENTS

| 680,389 | 8/1901 | McCullough | 32—17 |
| 1,257,947 | 2/1918 | Sternberg | 32—17 |
| 3,043,008 | 7/1962 | Barishman | 32—17 |

ROBERT E. MORGAN, Acting Primary Examiner.